(12) United States Patent
Pompea (10) Patent No.: US 11,465,709 B2
(45) Date of Patent: Oct. 11, 2022

(54) BICYCLE PEDAL AND CRANK SYSTEM THAT IS TRANSFORMABLE INTO FIXED FOOT PEGS

(71) Applicant: Gregory Kenneth Pompea, Danbury, CT (US)

(72) Inventor: Gregory Kenneth Pompea, Danbury, CT (US)

( * ) Notice: Subject to any disclaimer, the term of this patent is extended or adjusted under 35 U.S.C. 154(b) by 0 days.

(21) Appl. No.: 17/200,271

(22) Filed: Mar. 12, 2021

(65) Prior Publication Data

US 2021/0284276 A1 Sep. 16, 2021

Related U.S. Application Data

(60) Provisional application No. 63/100,453, filed on Mar. 12, 2020.

(51) Int. Cl.
*B62M 3/02* (2006.01)
*B62M 3/08* (2006.01)

(52) U.S. Cl.
CPC ............. *B62M 3/02* (2013.01); *B62M 3/08* (2013.01)

(58) Field of Classification Search
CPC . B62M 3/02; B62M 3/08; B62M 3/04; B62K 15/00
USPC ....................................................... 74/594.7
See application file for complete search history.

(56) References Cited

U.S. PATENT DOCUMENTS

| | | | |
|---|---|---|---|
| 3,922,929 A * | 12/1975 | Marchello ................ | B62M 3/02 74/562 |
| 4,019,230 A * | 4/1977 | Pollard ..................... | B62M 1/24 280/214 |
| 4,973,046 A * | 11/1990 | Maxwell .......... | A63B 21/00178 482/60 |
| 5,161,430 A * | 11/1992 | Febey ...................... | B62M 3/02 74/594.1 |
| 7,017,444 B2 * | 3/2006 | Kim ......................... | B62M 3/02 403/322.2 |
| 2005/0020411 A1 * | 1/2005 | Andrews .................. | B62M 3/02 482/57 |
| 2006/0027994 A1 * | 2/2006 | Misevski ................. | B62M 3/06 280/259 |

(Continued)

FOREIGN PATENT DOCUMENTS

| CN | 2595653 Y | * 12/2003 | .............. B62M 3/08 |
|---|---|---|---|
| CN | 204606118 U | * 9/2015 | .............. B62M 3/08 |

(Continued)

OTHER PUBLICATIONS

EPO Machine Translation of CN 2595653Y, Yang, Dec. 31, 2003 (Year: 2003).*

(Continued)

*Primary Examiner* — Vinh Luong
(74) *Attorney, Agent, or Firm* — The Farrell Law Firm, P.C.

(57) ABSTRACT

A hybrid bicycle pedal and crank system includes a chain ring, a foot peg mount disposed on at least one side of the chain ring, and a foot peg rotatably mounted to the foot peg mount on at least one side of the chain ring and configured to rotate from a pedaling position in which the foot peg is offset from a center axis of the chain ring to a fixed foot peg position in which the foot peg is fixed in alignment with the center axis of the chain ring.

7 Claims, 10 Drawing Sheets

(56) References Cited

U.S. PATENT DOCUMENTS

| | | | | |
|---|---|---|---|---|
| 2007/0039412 A1* | 2/2007 | Day | ............... | B62M 3/02 |
| | | | | 74/594.1 |
| 2010/0192722 A1* | 8/2010 | Shiu | ............... | B62M 3/00 |
| | | | | 74/594.7 |
| 2012/0090424 A1* | 4/2012 | Curran | ............... | B62M 3/08 |
| | | | | 29/428 |
| 2018/0272184 A1* | 9/2018 | Vassilaros | ............... | B62M 3/02 |
| 2020/0047846 A1* | 2/2020 | Zhu | ............... | B62M 3/08 |
| 2020/0148302 A1* | 5/2020 | Gatto | ............... | B62M 3/00 |

FOREIGN PATENT DOCUMENTS

| | | | | | |
|---|---|---|---|---|---|
| CN | 104417640 B | * | 4/2017 | ............... | B62M 3/08 |
| GB | 2548215 A | * | 9/2017 | ............... | B62M 3/08 |

OTHER PUBLICATIONS

EPO Machine Translation of CN 204606118U, Wang, Sep. 2, 2015 (Year: 2015).*

* cited by examiner

FIG. 10

BICYCLE PEDAL AND CRANK SYSTEM THAT IS TRANSFORMABLE INTO FIXED FOOT PEGS

PRIORITY

This application claims priority under 35 U.S.C. § 119(e) to U.S. Provisional Application Ser. No. 63/100,453, which was filed in the U.S. Patent and Trademark Office on Mar. 12, 2020, the contents of which are incorporated herein by reference.

BACKGROUND

1. Field of the Invention

The present invention relates generally to a bicycle, and more particularly, to a hybrid bicycle pedal and crank system that can quickly and conveniently convert into fixed foot pegs operable on an ebike or any other 2-wheel or 3-wheel motor-driven vehicle equipped with operable pedals.

2. Description of the Related Art

Modern day bicycles are propelled by a pedal system whereby the rider pushes, with their feet, a set of pedals in a circular motion around a fixed rotational axis. The pedals drive a chain ring about the same rotational axis. The chain ring drives a chain or belt to transfer the rotational motion from the main chain ring to another chain ring that is attached to a wheel. The rotational force created by the rider at the pedals is thus ultimately transferred to the rear wheel which is in contact with the ground, resulting in propulsion of the bicycle.

In recent years, many bicycle manufacturers have adapted electric motors to their bikes. These motors can "assist" or independently propel the bicycle. Current federal and state regulations limit the power and manner in which the motors can either assist or propel the bike. These regulations are required in order for an electric bike, hereinafter referred to as an "ebike", to be considered street legal and thus be ridden on the streets without the requirements of motor vehicle registration and insurance.

Ebikes are manufactured for various purposes, including off road use. Ebikes for off road use may or may not have a pedal system. Without a pedal system, the bike may be propelled by only a motor controlled by a throttle. An advantage of the pedal system is that the rider can pedal the bike in the event the battery fully exhausts its charge. With operable pedals, the rider does not need to push the bike; rather, the rider can propel the ebike in the manner of an ordinary non-motorized bicycle. Another advantage of the pedal system is that the rider can ride the bike legally on the street. Ebikes without pedals may be considered motorcycles and may be required to be registered and insured.

A disadvantage of a conventional pedal system is that pedals are not optimum for off road purposes riding under full electric power while operating solely by throttle. Currently, owners of ebikes for off road use must decide whether they would like their ebike configured with a pedal system or with fixed foot pegs. It is not practical to have both systems simultaneously installed, as the motion of a pedaling system would be compromised by a fixed foot peg arrangement and vice versa. The rider can, with the use of tools, appreciable time and adequate knowledge, exchange one system for the other by removing the undesired system and installing the other, which is impractical and inconvenient for the rider.

Thus, there is a need in the art for a pedal set that is convertible to fixed foot pegs, such as those on a motorcycle. Specifically, there is a need in the art for foot pegs that enable the rider to quickly and conveniently convert the pedal system for bicycle operation, i.e., motor assisted human powered propulsion, to a fixed foot peg configuration for operating an ebike, i.e., motor only propulsion, or any other 2 or 3-wheel vehicle equipped with operable pedals, so as to provide a convertible, dual purpose pedal system for the rider.

SUMMARY

The present invention has been made to address at least the above-mentioned problems and/or disadvantages and to provide at least the advantages described below.

Accordingly, an aspect of the present invention is to provide a hybrid bicycle pedal and crank system that transforms into fixed foot pegs.

Another aspect of the present invention is to provide a hybrid pedal design that is particularly useful for ebikes and enables the rider to rapidly, and without tools or special knowledge, convert from a pedal system to a fixed foot peg configuration, thereby providing the rider with a practical, dual purpose pedal system.

In accordance with an aspect of the present invention, a hybrid bicycle pedal and crank system that converts to a fixed foot pegs includes at least one foot peg mount, at least one foot peg mount bearing, at least one inner crank arm, at least one outer crank arm, at least one crank arm lock pin, and at least one foot peg configured to be mounted to the at least one foot peg mount through the at least one foot peg mount bearing at an end of the outer crank arm.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION

Embodiments of the present invention will be described herein below with reference to the accompanying drawings. However, the embodiments of the present invention are not limited to the specific embodiments and should be construed as including all modifications, changes, equivalent devices and methods, and/or alternative embodiments of the present invention. Descriptions of well-known functions and/or configurations will be omitted for the sake of clarity and conciseness.

The terms and words used in the following description and claims are not limited to their dictionary meanings but are merely used to enable a clear and consistent understanding of the present invention. Accordingly, it should be apparent to those skilled in the art that the following description of embodiments of the present invention is provided for illustrative purposes only and not for the purpose of limiting the present invention as defined by the appended claims and their equivalents.

Singular terms "a," "an," and "the" include plural references unless the context clearly dictates otherwise. For example, reference to "a component surface" includes reference to one or more of such surfaces.

The embodiments are described herein by way of illustration only and should not be construed in any way to limit the scope of the present invention. Those skilled in the art will understand that the principles of the present invention may be implemented in any suitably arranged electronic device.

As used herein, the term "substantially" indicates that the recited characteristic, parameter, or value need not be achieved exactly, but that variations such as tolerances, measurement errors, measurement accuracy limitations and other factors known to those of ordinary skill in the art, may occur in amounts that do not preclude the effect the characteristic was intended to provide.

The expressions "have," "may have," "include," and "may include" as used herein indicate the presence of corresponding features, such as numerical values, functions, operations, or parts, and do not preclude the presence of additional features. The expressions "A or B," "at least one of A or/and B," or "one or more of A or/and B" as used herein include all possible combinations of items enumerated with them. For example, "A or B," "at least one of A and B," or "at least one of A or B" indicate (1) including at least one A, (2) including at least one B, or (3) including both at least one A and at least one B.

Terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. A first element may be referred to as a second element without departing from the scope the present invention, and similarly, a second element may be referred to as a first element.

When a first element is "operatively or communicatively coupled with/to" or "connected to" another element, such as a second element, the first element may be directly coupled with/to the second element, and there may be an intervening element, such as a third element, between the first and second elements. To the contrary, when the first element is "directly coupled with/to" or "directly connected to" the second element, there is no intervening third element between the first and second elements.

All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present invention.

Figure 1:
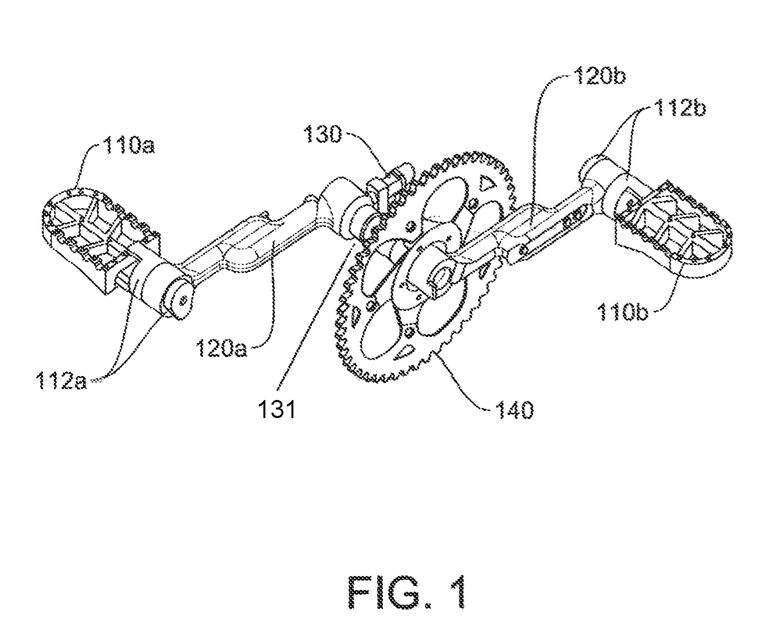
FIG. 1 illustrates components of a pivoting version of the pedal system according to a first embodiment.

FIG. 1 illustrates components of a pivoting version of the pedal system according to the first embodiment.

Figure 3:
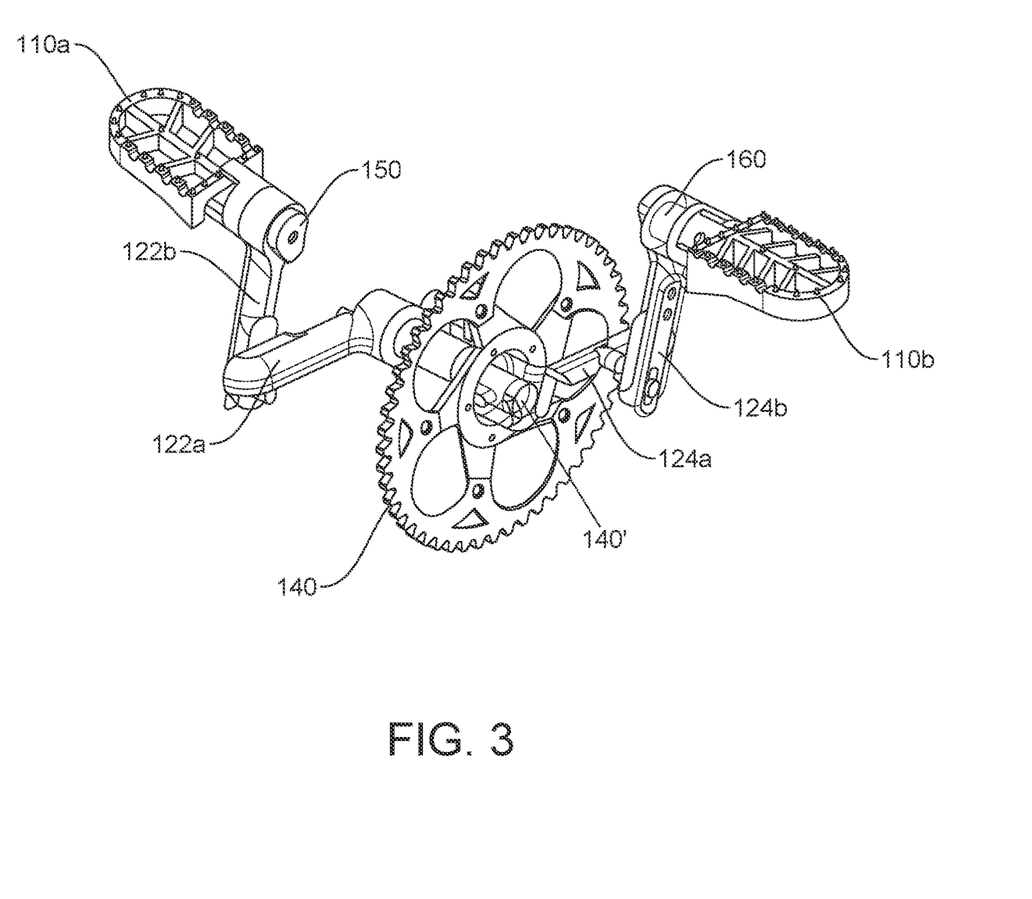
FIG. 3 illustrates left and right outer crank arms pivoting about a crank arm pivot pin in a transitioning state of the pedal system according to the first embodiment.

As seen in FIG. 1, on a left side of a chain ring 140, a foot peg 110a is rotatably attached to a foot peg mount 112a that is mounted on one end, to an outer crank arm 122b of a crank arm assembly 120a having an inner crank arm 122a and outer crank arm 122b (see FIG. 3). The foot peg mount 112a may be mounted to the outer arm by a foot peg mount bearing 160 (see FIG. 3), or by a telescoping crank arm (see FIGS. 8-10).

The crank arm assembly 120a is mounted to a bottom bracket 131 that protrudes through a center of the chain ring 140 on one end and is configured to be locked in an extended position (i.e., a pedaling position for motor-assisted human-powered propulsion) that is rotatable around the chain ring 140 axis and is relative to the crank arm assembly 120a, as depicted in FIG. 1, due to the engagement of a retractable crank assembly locking pin 130 into a locating hole 135 (see FIGS. 2 and 5) on the bottom bracket 131. The crank assembly locking pin 130 is disposed on the bottom bracket 131, which is of a typical type on a bicycle. In FIG. 1, the crank arm assembly lock pin 130 is disengaged from the assembly and becomes engaged with the assembly by being rotated 180 degrees (see FIGS. 5 and 6).

A similar construction exists on the right side of the chain ring 140, where the foot peg 110b is rotatably attached to a foot peg mount 112b that is mounted to a crank arm assembly 120b. As seen in FIG. 1, the right foot peg 110b is closer to the axis on which the chain ring 140 rotates than the left foot peg 110a, due to the bottom bracket 131 including the crank assembly locking pin 130 being located on the left side of the pedal assembly between the crank arm assembly 120 and the chain ring 140.

The pedal system of FIG. 1 is a hybrid pedal system, such that it quickly converts from the illustrated bicycle pedal configuration to a fixed foot peg configuration and vice versa, based on the engagement of the crank assembly locking pin 130. This eliminates the inconvenient and inefficient process of removing one configuration in favor of the other configuration, as in the conventional art.

Figure 2:
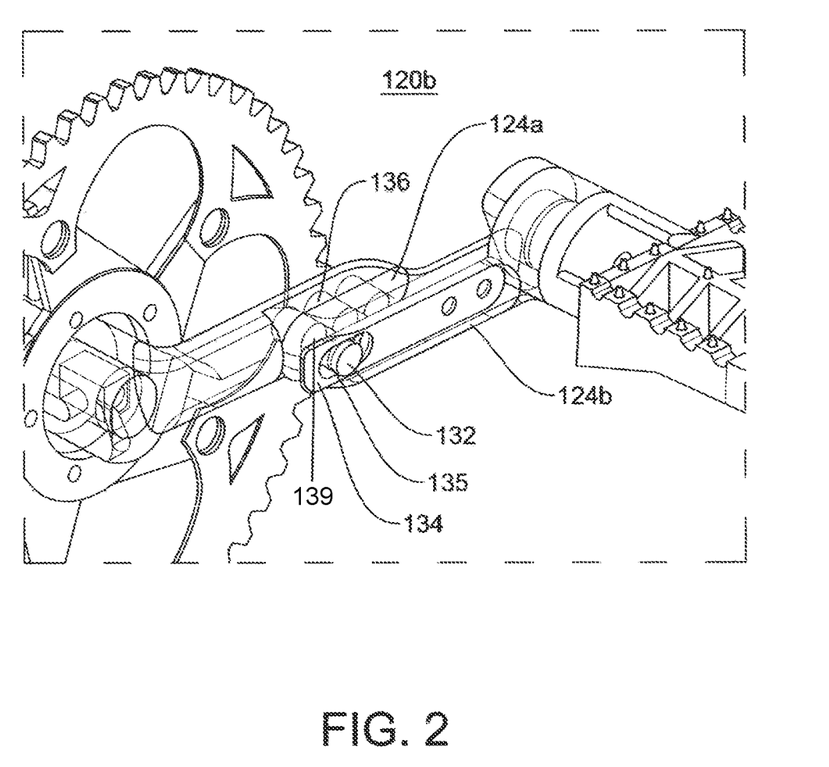
FIG. 2 illustrates a reconfigurable crank arm assembly of the pivoting version of the pedal system according to the first embodiment.

FIG. 2 illustrates a reconfigurable crank arm assembly of the pivoting version of the pedal system according to the first embodiment.

Figure 5:
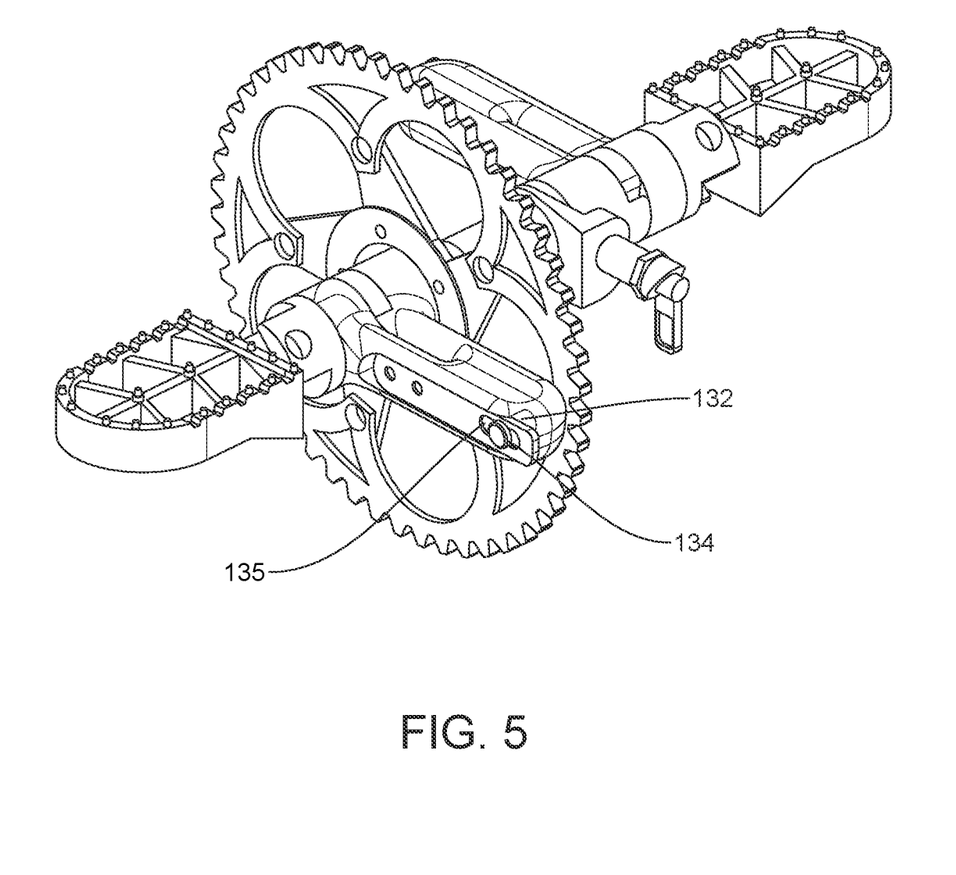
FIG. 5 illustrates the fixed foot peg mode of the pedal system including the foot pegs fully transitioned to the center axis of the chain ring according to the first embodiment.
Figure 6:
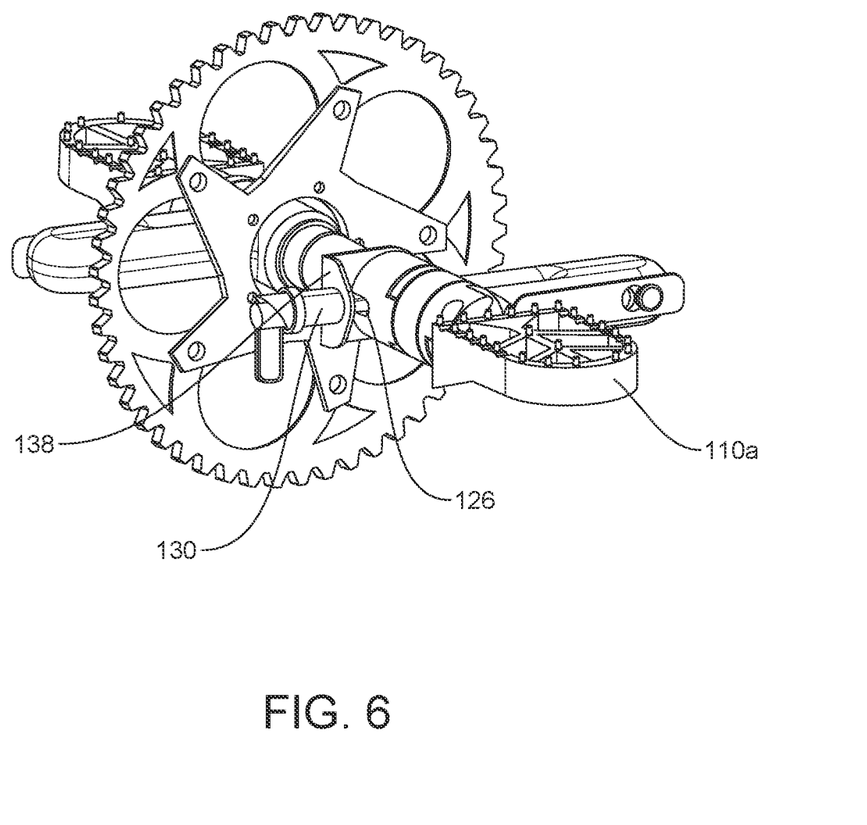
FIG. 6 illustrates the pivoting version of the pedal system fully converted to a fixed peg system according to the first embodiment.

In FIG. 2, a detailed depiction of the reconfigurable crank arm assembly 120b is provided, in that FIG. 2 illustrates the components involved in releasing a crank arm pivot pin 136 and folding the outer crank arm 124b over 180 degrees such that the crank arm assembly 120b converts from the pedal configuration of FIG. 1 and ultimately locks into the fixed foot peg position, as described in FIGS. 5 and 6.

A crank arm lock pin 132, pivot lock pin spring 134, and the crank arm pivot pin 136 are included in the crank arm assembly 120b. In operation, a rider can pull the pivot lock pin spring 134 to disengage the crank arm lock pin 132 from the inner crank arm 124a. This will enable folding of the outer crank arm 124b by 180 degrees about the axis of the crank arm pivot pin 136 and into an adjacent position with the inner crank arm 124a such that the foot pegs and corresponding bearings are centrally located on the same axis as the chain ring 140 and are locked into the fixed peg position, such as for motor only propulsion.

FIG. 3 illustrates left and right outer crank arms pivoting about a crank arm pivot pin in a transitioning state of the pedal system according to the first embodiment.

In FIG. 3, the outer crank arms 122b, 124b and inner crank arms 122a, 124a pivot about the crank arm pivot pin 136 (see FIG. 2), which is identical on the left and right sides of the pedal assembly and may be converted by the rider from the pedaling position in FIGS. 1 and 2, adapted for motor-assisted human-powered propulsion, to a rigidly locked foot peg position in FIGS. 5 and 6, adapted for motor only propulsion, due to the engagement of the crank arm lock pin 132 into the locating hole 135 on the inner crank arm 122a, 124a. By pulling the pivot lock pin spring 134 (see FIG. 2), the rider can disengage the crank arm lock pin 132 from the inner crank arms 122a, 124a, enabling the outer crank arms 122b, 124b to pivot about the crank arm pivot pin 136.

Figure 4:
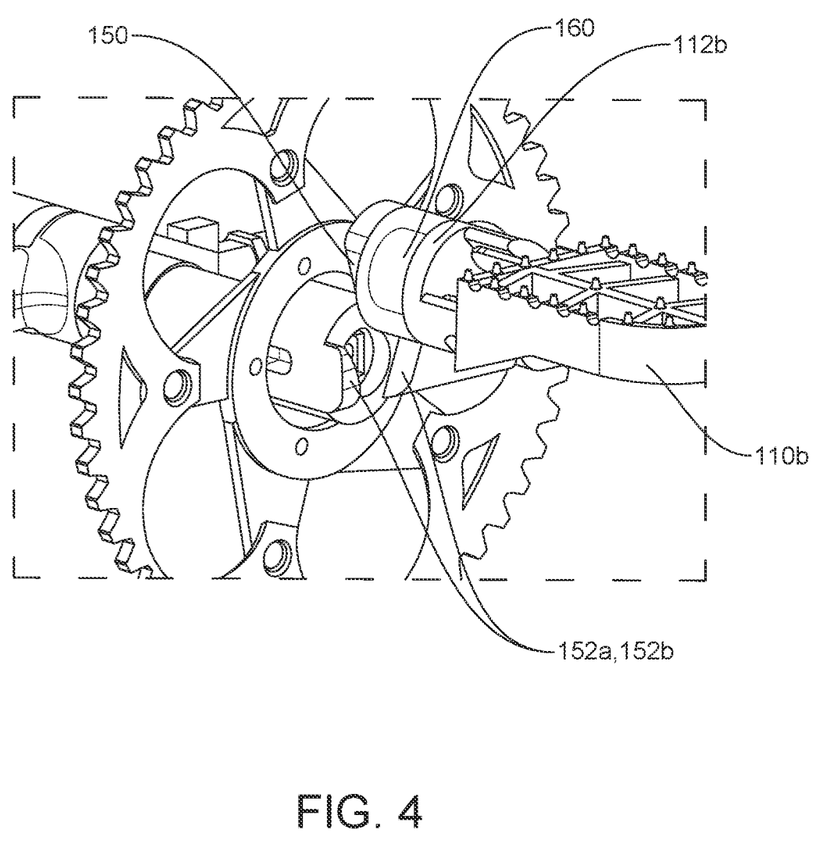
FIG. 4 illustrates an engagement of a taper on the foot peg mount and tapers on the inner crank arm in the right crank arm assembly in the transitioning state according to the first embodiment.

In turn, the foot peg mount taper 150 on each side and the inner and outer crank arms 122a, 124a engage, causing the rotation of the foot pegs 110a, 110b about the rotational axis of the foot peg mount bearing 160 to be locked into a horizontal position, as described in reference to FIG. 4.

FIG. 4 illustrates an engagement of the taper on the foot peg mount and tapers on the inner crank arm in the right crank arm assembly 120b in the transitioning state according to the first embodiment.

In FIG. 4, the engagements of the foot peg mount taper 150, identical on both sides of the pedal system, and the inner crank arm tapers 152a, 152b are illustrated. When the foot peg mount taper 150 and the inner crank arm 122a are engaged, the rotation of the foot peg 110b about the rotational axis of the foot peg mount bearing 160, identical on both sides of the pedal system, is locked with the foot peg 110b in the illustrated horizontal position, enabling the rider to operate the vehicle in a fixed peg mode suitable for motor only propulsion. In addition, the tapering at the foot peg mounts creates a firmer support of the assembly in the selected manner.

For example, when the outer crank arm 124b is folded over adjacent to the inner crank arm 124a, the crank arm lock pin 132 is engaged with a hole 139 in the inner crank arm 124a (see FIG. 2). In this manner, the crank arm is locked into the folded position, as will be described in FIG. 5.

FIG. 5 illustrates the fixed foot peg mode of the pedal system including the foot pegs fully transitioned to the center axis 140' (see FIG. 3) of the chain ring according to the first embodiment.

In FIG. 5, by force of the crank arm lock pin spring 134, the crank arm lock pin 132 is engaged in a positioning hole 135 of the inner crank arm 122a by the rider. Specifically, the crank arm lock pin 132 engages the positioning hole 135 when the outer crank arm 122b is fully folded in the fixed foot peg mode illustrated in FIG. 5. In contrast, the crank arm lock pin 132 engages another positioning hole when the crank arms are flipped apart 180 degrees, as in FIGS. 1 and 2. As such, these two holes are 180 degrees opposed from one another about the axis of the crank arm lock pin 132.

FIG. 6 illustrates the pivoting version of the pedal system fully converted to a fixed peg system according to the first embodiment.

In FIG. 6, the crank assembly locking pin 130 is fixed to the bottom bracket via a locking pin mounting bracket 138. The crank assembly locking pin 130 is engaged into the inner crank arm slot 126 of the inner crank arm 122a. This action locks the crank arm assembly 120a into place, preventing the pedals from spinning about the center of the chain ring 140. Accordingly, the foot pegs are directly opposed from one another, enabling the vehicle to be operated in the fixed peg mode.

Figure 7:
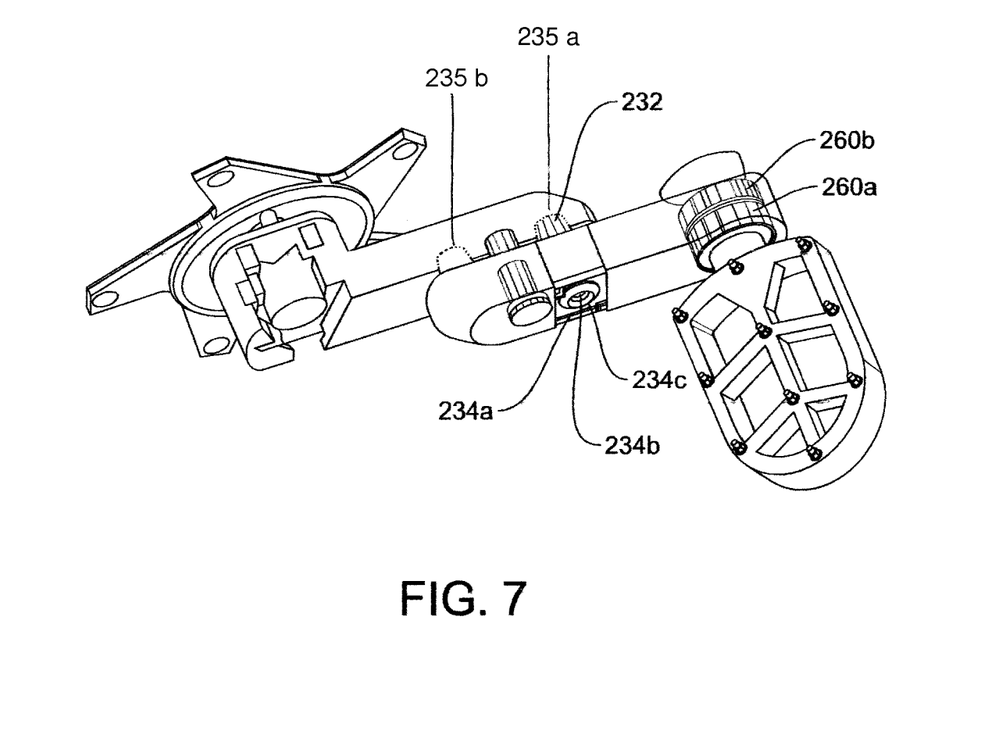
FIG. 7 illustrates a reconfigurable crank arm assembly of the pivoting version of the pedal system according to a second embodiment.

FIG. 7 illustrates a reconfigurable crank arm assembly of the pivoting version of the pedal system according to a second embodiment.

In FIG. 7, the second embodiment is introduced as an added safeguard against an unwanted backward rolling of the bicycle in the bicycle configuration, such as when the pedals rotate backward while coasting on level ground or downhill. Such an action could potentially cause increased torque on the chain ring 140, which could compromise the crank assembly locking pin 130 and/or the locking pin mounting bracket 138 (see FIG. 6).

As such, in FIG. 7, a tapered lock pin 232 engages a tapered outer locating hole 235a when in the extended horizontal position instead of an inner locating hole 135, as in the first embodiment. Conversely, when folded into the fixed foot peg mode, the tapered lock pin 232 engages a tapered inner locating hole 235b. Thus, in the second embodiment, a crank arm still pivots and the tapered lock pin 232 retracts and enables a locking of the foot pegs into a locked position. Specifically, the tapered lock pin engages one of two tapered positioning holes (see description of holes in FIG. 5), increasing the firmness of the pin locking mechanism.

Further in FIG. 7, the pivot lock pin spring 134 in the first embodiment is replaced with a C-shaped piece 234a, which is attached to the tapered lock pin 232, and two standard diagonally opposed extension springs 234b, 234c. Additionally, the foot peg mount bearing includes two sealed ball bearings 260a, 260b, for increased pivoting ability. These ball bearings 260a, 260b are sealed to prevent susceptibility to contaminants.

It is to be understood that the pedal design in the second embodiment illustrated in FIG. 7 is applicable as an alternative to the pedal designs illustrated in FIGS. 1-6 and 8-10. The second embodiment may improve on the first embodiment due to the addition of the above-described components, particularly the tapered pin 232 on either side of the assembly, which removes "play" from the mechanism.

Figure 8:
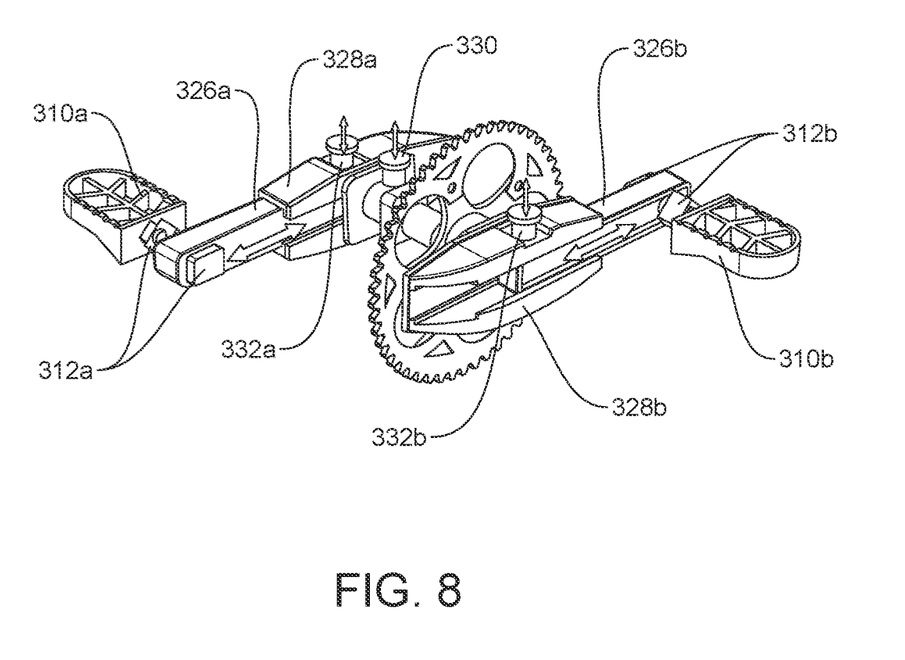
FIG. 8 illustrates components of a telescoping version of the pedal system according to a third embodiment.

FIG. 8 illustrates components of a telescoping version of the pedal system according to a third embodiment.

In FIG. 8, telescoping crank arms 326a, 326b and crank arm channels 328a, 328b are rigidly locked in the extended position due to the engagement of the crank arm lock pins 332a, 332b into a selected one of locating holes 335a, 335b in the telescoping crank arms 326a, 326b. The rider can pull the crank arm lock pins 332a, 332b to disengage from the locating holes 335a, 335b in the telescoping crank arms 326a, 326b to enable the telescoping crank arms 326a, 326b to move laterally within the crank arm channels 328a, 328b.

As seen in FIG. 8, the telescoping crank arms 326a, 326b may move laterally to the fixed peg position, such as for motor only propulsion, while the telescoping crank arms 326a, 326b move from the extended pedal position, adapted for motor-assisted human-powered propulsion, to the retracted fixed foot peg position.

Thus, the crank arm assembly in FIG. 8 is telescopic in nature, such that the pedals move laterally from the extended position for pedal mode to the retracted position for fixed peg mode.

Figure 9:
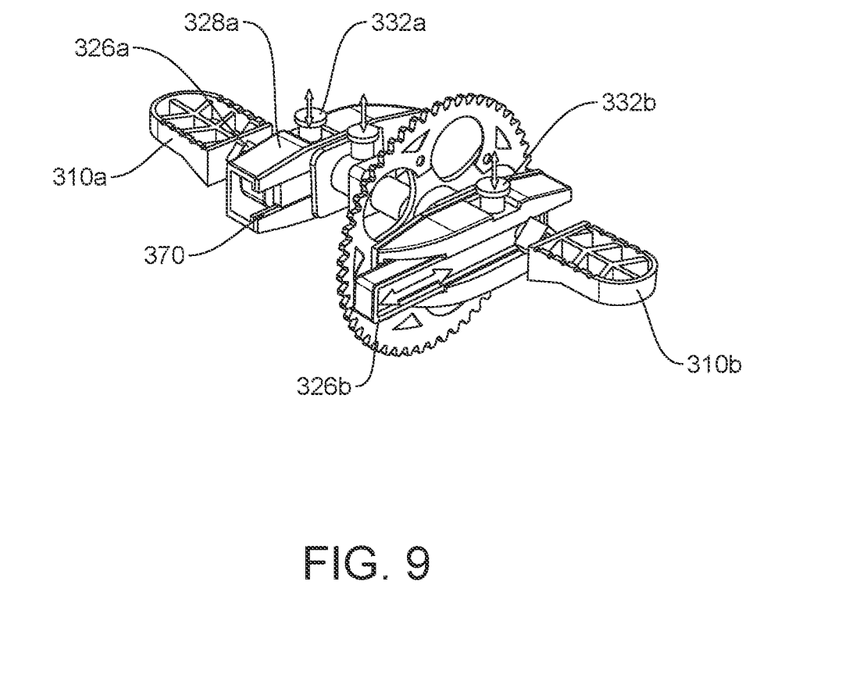
FIG. 9 illustrates the telescoping version of the pedal system converting into the fixed foot peg system according to the third embodiment.

FIG. 9 illustrates the telescoping version of the pedal system converting into the fixed foot peg system according to the third embodiment.

In the telescoping version in FIG. 9, the pedal system is provided such that the crank arm lock pins 332a, 332b are engaged in a selected locating hole 335a, 335b in the telescoping crank arm 326a, 326b.

In the telescoping version in FIG. 9, the square shaped foot peg mount 312a engages with the anti-rotation slot 370 of the crank arm channel 328a. When the square shaped foot peg mount 312a is fully engaged in this manner, the rotation of the foot peg 310a about the rotational axis of the foot peg mount bearing (see 160 in FIG. 3, or alternatively, 260a, 260b in FIG. 7) is locked with the foot pegs 310a, 310b in the horizontal position.

Figure 10:
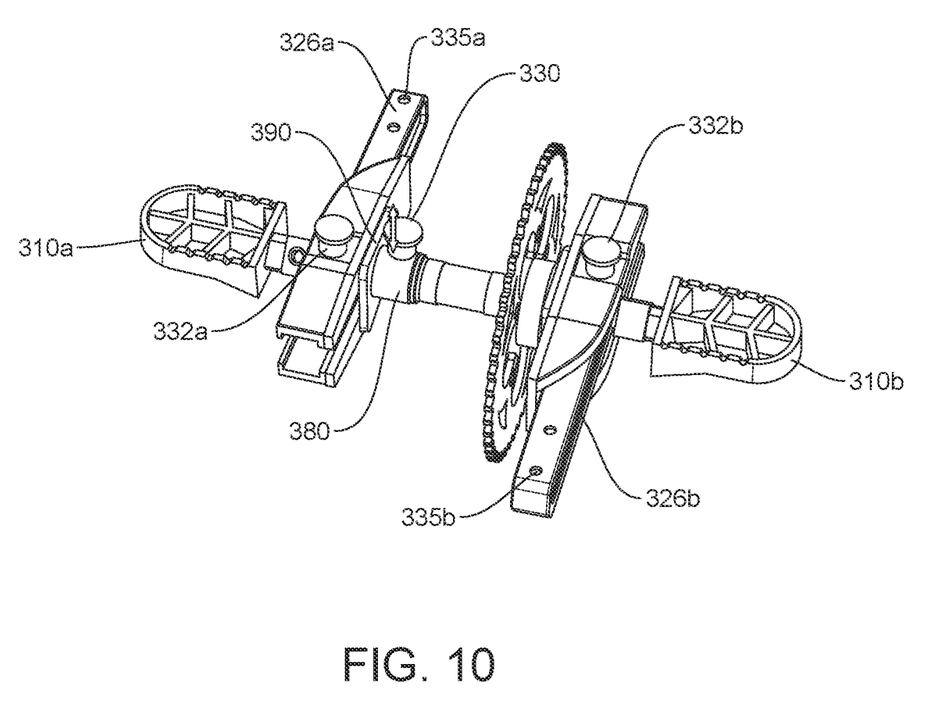
FIG. 10 illustrates the telescoping version of the pedal system fully converted into the fixed peg system according to the third embodiment.

FIG. 10 illustrates the telescoping version of the pedal system fully converted into the fixed peg system according to the third embodiment.

In FIG. 10, the final step of the conversion process in the third embodiment is to engage the crank assembly locking pin 330 into a slot 380 of a crank arm channel mount 390. This action locks the foot pegs 310a, 310b into place by way of the crank arm lock pins 332a, 332b. The crank assembly locking pin 330 locks the entire crank assembly. Once fully converted, the pedals are precluded from spinning about the center axis of the chain ring.

Embodiments of the present invention disclosed in the specification and the drawings are only particular examples disclosed in order to easily describe the technical matters of the present invention and assist with comprehension of the present invention, and do not limit the scope of the present invention. Therefore, in addition to the embodiments disclosed herein, the scope of the embodiments of the present invention should be construed to include all modifications or modified forms drawn based on the technical aspects of the embodiments of the present invention.

While the present invention has been described with reference to various embodiments, various changes may be made without departing from the spirit and the scope of the present invention, which is defined, not by the detailed description and embodiments, but by the appended claims and their equivalents.

What is claimed is:

1. A hybrid bicycle pedal and crank system, comprising:
a chain ring;
a crank arm assembly disposed on at least one side of the chain ring and including an inner crank arm and an outer crank arm;
a locking pin mounting bracket;
a bottom bracket that protrudes through a center axis of the chain ring;
a crank assembly locking pin disposed on the bottom bracket and configured to retract;
a foot peg mount disposed on the at least one side of the chain ring;
and
a foot peg rotatably mounted to the foot peg mount on the at least one side of the chain ring and configured to rotate, when moved by a user, from a pedaling position in which the foot peg is offset from a center axis of the chain ring to a fixed foot peg position in which the foot peg is fixed in alignment with the center axis of the chain ring,
wherein the inner crank arm includes a first end and a second end and is mounted to the bottom bracket that protrudes through the center axis of the chain ring on the first end,
wherein the outer crank arm is rotatably mounted to the second end of the inner crank arm, and
wherein the crank assembly locking pin is fixed to the bottom bracket by the locking pin mounting bracket and is configured to retractably engage an inner crank arm slot of the inner crank arm.

2. The system of claim 1,
wherein, when the foot peg is in the pedaling position, the system is adapted for pedaling by the user, and
wherein, when the foot peg is in the fixed foot peg position, the system is configured to lock rotation of the foot peg with the foot peg being in a horizontal position relative to the center axis of the chain ring.

3. The system of claim 1, further comprising:
a foot peg mount bearing configured to mount the foot peg mount to the outer crank arm,
wherein the foot peg is rotatably mounted to the foot peg mount through the foot peg mount bearing at an end of the outer crank arm.

4. The system of claim 3,
wherein the foot peg mount bearing includes two sealed ball bearings.

5. The system of claim 1,
wherein the bottom bracket including the crank assembly locking pin is located between the crank arm assembly and the chain ring.

6. A hybrid bicycle pedal and crank system, comprising:
a chain ring;
a crank arm assembly disposed on at least one side of the chain ring and including an inner crank arm and an outer crank arm;
a bottom bracket that protrudes through a center axis of the chain ring;
a foot peg mount disposed on at least one side of the chain ring;
a tapered lock pin;
a tapered outer locating hole formed in the outer crank arm;
a foot peg mount bearing configured to mount the foot peg mount to the outer crank arm through the foot peg mount bearing at an end of the outer crank arm; and
a foot peg rotatably mounted to the foot peg mount on the at least one side of the chain ring and configured to rotate, when moved by a user, from a pedaling position in which the foot peg is offset from a center axis of the chain ring to a fixed foot peg position in which the foot peg is fixed in alignment with the center axis of the chain ring,
wherein the inner crank arm includes a first end and a second end and is mounted to the bottom bracket that protrudes through the center axis of the chain ring on the first end, wherein the outer crank arm is rotatably mounted to the second end of the inner crank arm, and wherein the inner crank arm and the outer crank arm are configured to be rigidly locked in the pedaling position by the tapered lock pin being engaged in the tapered outer locating hole.

7. The system of claim 6, further comprising:

a tapered inner locating hole formed in the inner crank arm, wherein the inner crank arm and the outer crank arm are configured to be rigidly locked in the fixed foot peg position by the tapered lock pin being engaged in the tapered inner locating hole.

\* \* \* \* \*